United States Patent [19]

Bergeron

[11] Patent Number: 4,861,050
[45] Date of Patent: Aug. 29, 1989

[54] CRAFTMAN'S VALET

[76] Inventor: Jean J. Bergeron, 23 W. Boylston Dr., Worcester, Mass. 01606

[21] Appl. No.: 125,485

[22] Filed: Nov. 25, 1987

[51] Int. Cl.⁴ ............................................. B62B 3/02
[52] U.S. Cl. ............................ 280/47.35; 280/79.2; 280/79.5; 248/129; 312/DIG. 33
[58] Field of Search ................. 280/32.5, 47.24, 47.26, 280/47.34, 47.35, 79.2, 79.3, 79.11, 79.5, 79.6, 79.7; 248/129, 311.2, 346; 312/DIG. 33

[56] References Cited

U.S. PATENT DOCUMENTS

| | | | |
|---|---|---|---|
| 514,945 | 2/1894 | Lockman | 280/79.3 |
| 931,849 | 8/1909 | Dickinson | 248/129 |
| 1,357,104 | 10/1920 | Lightfoot | 280/47.35 |
| 1,746,134 | 2/1930 | Thompson | 280/79.2 |
| 2,580,623 | 1/1952 | Wahl | 248/129 |
| 2,614,698 | 10/1952 | Bell | 280/79.2 |
| 2,636,705 | 4/1953 | Stanton | 248/129 |
| 2,854,686 | 10/1958 | Hansen | 280/47.35 |
| 3,162,462 | 12/1964 | Elders | 280/79.2 |
| 3,240,458 | 3/1966 | Schaeffer | 248/129 |
| 3,339,938 | 9/1967 | Edmisson | 280/79.3 |
| 3,446,386 | 5/1969 | Wellington | 280/79.2 |
| 3,494,631 | 2/1970 | Kreider | 248/129 |
| 3,642,239 | 2/1972 | Zeiler, Jr. | 248/311.2 X |
| 3,726,535 | 4/1973 | Longato | 280/79.2 X |
| 3,834,725 | 9/1974 | Luoni | 280/79.2 |
| 3,892,331 | 7/1975 | Beck | 312/DIG. 33 X |
| 4,460,188 | 7/1984 | Maloof | 280/47.26 X |

FOREIGN PATENT DOCUMENTS

| | | | |
|---|---|---|---|
| 192106 | 11/1956 | Austria | 280/47.26 |
| 450809 | 8/1948 | Canada | 280/79.2 |
| 239187 | 12/1945 | Fed. Rep. of Germany | 312/DIG.33 |
| 1142746 | 9/1957 | France | 280/47.35 |

Primary Examiner—Charles A. Marmor
Assistant Examiner—Brian L. Johnson
Attorney, Agent, or Firm—Blodgett & Blodgett

[57] ABSTRACT

A craftsman's valet which has a wheeled supporting base, a pedestal which is mounted on the supporting base for supporting a bucket. The valet is also provided with storage compartments, a removable seat and a light fixture.

15 Claims, 2 Drawing Sheets

CRAFTMAN'S VALET

BACKGROUND OF THE INVENTION

The present invention relates to a utility item or valet for craftsmen such as painters, plasterers, tapers or other craftsmen in the building trade who perform indoor finish work. In the typical work situation in which these craftsmen work, there are few, if any, basic utilities to make their work easier. For example, there are no lighting fixtures to provide lighting, no chairs to sit on, or furnishings for the support of items or for the temporary storage of items. These and other difficulties experienced by craftsmen for the interior building trade, have been obviated by the present invention.

It is, therefore, a principal object of the invention to provide a craftsman's valet which satisfies all of the craftsman's needs in a work area which lacks basic utilities.

Another object of the invention is the provision of a craftsman's valet which provides a portable light source.

A further object of the present invention is the provision of a portable craftsman's valet which provides temporary storage of fixtures and tools.

It is another object of the present invention to provide a craftsman's valet for storage of fixtures and tools and which serves as a sitting stool.

A still further object of the invention is the provision of a craftsman's valet which can be partially dismantled and which is transportable between work sites.

It is a further object of the invention to provide a craftsman's valet which is inexpensive to manufacture and which is easy to use and transport.

With these and other objects in view, as will be apparent to those skilled in the art, the invention resides in the combination of parts set forth in the Specification and covered by the claims appended hereto.

SUMMARY OF THE INVENTION

In general, the invention consists of a craftsman's valet having a wheeled supporting base, and a pedestal which is mounted on the supporting base, and which has a top surface for supporting a circular bucket. More specifically, the valet is provided with a light fixture, storage compartments for tools and interior housing fixtures, and a seat for converting the valet into a sitting stool when the valet is not utilized for supporting a bucket.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
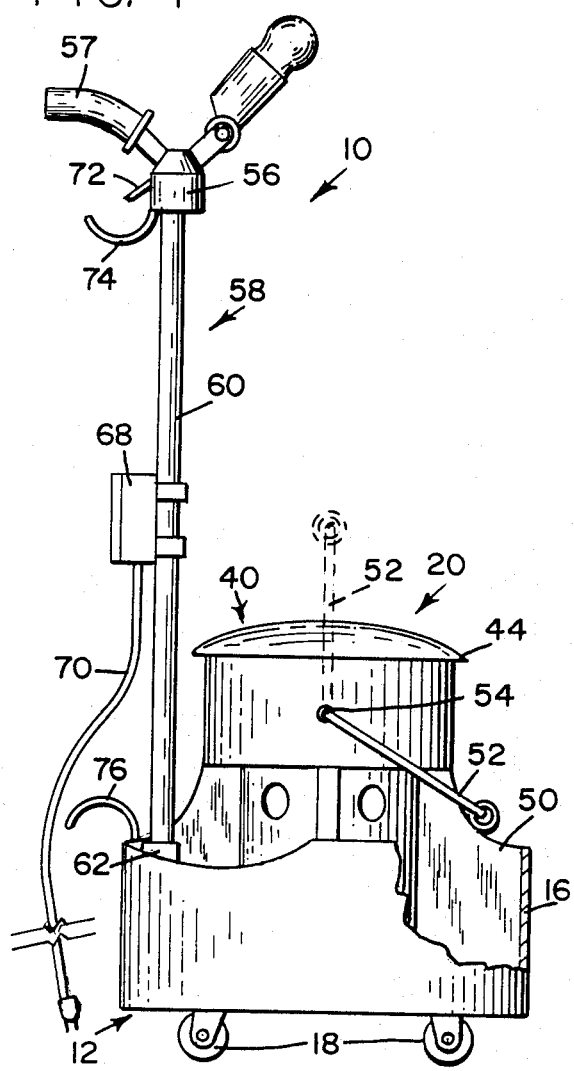
FIG. 1 is a side elevational view of the craftsman's valet of the present invention which is shown being utilized as a sitting stool.
Figure 2:
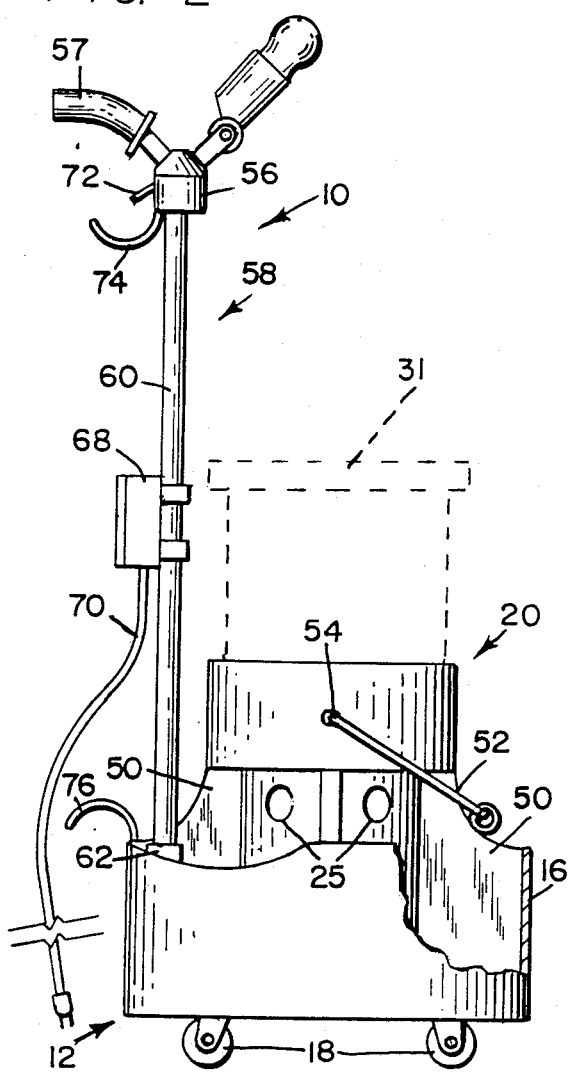
FIG. 2 is a side elevational view of the craftsman's valet which is shown being utilized for supporting a paint bucket.
Figure 3:
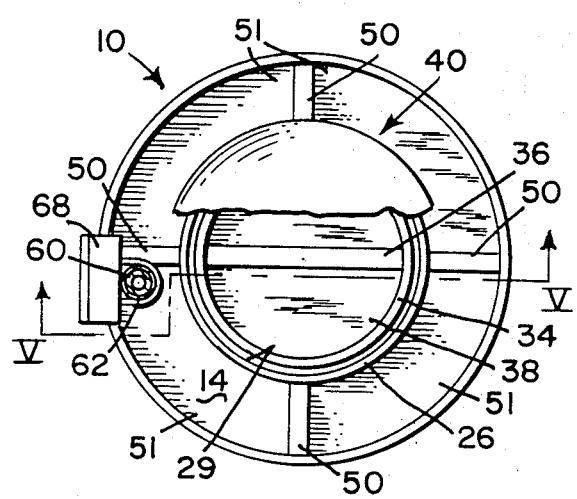
FIG. 3 is a partial plan view of the craftsman's valet as represented in FIG. 1.
Figure 4:
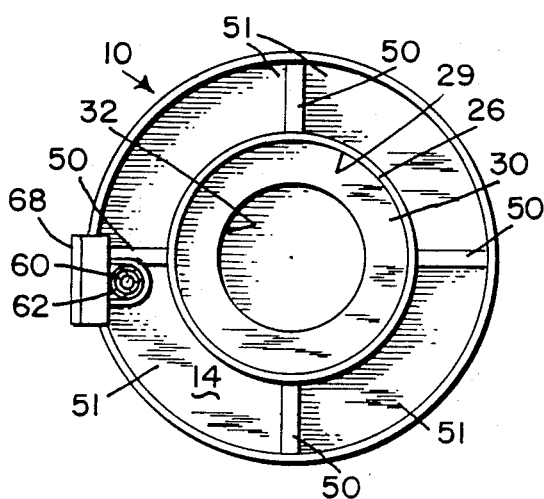
FIG. 4 is a partial plan view of the craftsman's valet as represented in FIG. 2.
Figure 8:
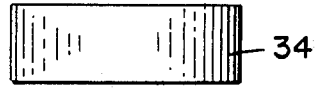
FIG. 8 is a side elevational view of a tool tray which is stored within the craftsman's valet of the present invention.
Figure 9:
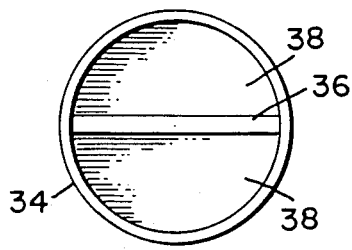
FIG. 9 is a top plan view of the tool tray which is shown in FIG. 8.

Referring first to FIGS. 1 and 2, the craftsman's valet of the present invention is generally indicated by the reference numeral 10 and comprises a supporting base which is generally indicated by the reference numeral 12, and a pedestal which is generally indicated by the reference numeral 20. The supporting base 12 includes a horizontal bottom wall 14 and a vertical annular side wall 16 which extends upwardly from the bottom wall 14. A plurality of castor wheels 18 are fixed to the bottom wall 14 and which enable the valet 10 to be moved easily along a flat supporting surface. The pedestal 20 includes a lower annular vertical wall 22 and an upper annular wall 26. The lower wall 22 defines a lower circular storage compartment 24, see also FIG. 5. The upper wall 26 defines an upper circular storage compartment 28. The lower wall 22 includes a plurality of apertures 25 so that the user can listen to a radio which is placed, if desired, in the compartment 24. The upper wall 26 defines a circular top opening 29 which is closed by a cover which is generally indicated by the reference numeral 40. The upper and lower walls 26 and 22, respectively, are divided by a horizontal shelf 30 which has a circular central opening 32 which connects the upper chamber 28 to the lower chamber 24. The shelf 30 supports a circular paint bucket which is placed in the compartment 28 as indicated by the dotted lines 31 in FIG. 2. The shelf 30 also supports a circular tool tray 34 when the tool tray is located within the upper chamber 28. The tool tray 34 includes a central partition 36 which divides the tray into two compartments 38 (see also FIGS. 8 and 9).

Figure 6:
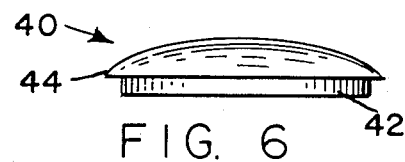
FIG. 6 is a side elevational view of a seat which forms part of the valet when it is utilized as a sitting stool.
Figure 7:
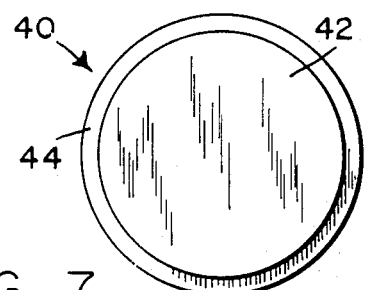
FIG. 7 is a bottom plan view of the seat which is shown in FIG. 6.

Referring also to FIGS. 6 and 7, the cover 40 includes a circular leg portion 42 which fits into the opening 29 and a horizontal flange portion 44 which rests on top of the annular upper edge of the wall 26. The top of the cover 40 is provided with soft cushiony material such as foam rubber 46 which is enclosed within an outer cover of flexible sheet material 48.

The valet 10 also comprises a plurality of vertical partitions 50 which extend between the vertical walls 22 and 16 and divide the space between these two walls into a plurality of compartments 51. A bail-type handle 52 is pivotally connected at 54 to the wall 26 at opposite sides of the wall 26. This enables the handle 52 to be moved from an inoperative position as shown in solid lines in FIG. 1 to an operative position shown in dotted lines in FIG. 1.

Referring particularly to FIGS. 1 and 2, the valet 10 also comprises a light fixture 56 and a handle 57 which are supported in an elevated position relative to the rest of the valet 10 by a supporting fixture which is generally indicated by the reference numeral 58. The supporting fixture 58 comprises a vertical tube 60 which is telescopingly mounted within a larger tube 62 which is fixed to the supporting base 12, see also FIG. 5. The walls of the tube 60 and 62 have matching apertures which are horizontally aligned when the tube 60 is properly positioned within the tube 62. A locking pin 64 is anchored to the tube 62 by a chain 66 to prevent the pin from being lost or accidentally misplaced. When the tube 60 is positioned within the tube 62 so that the respective apertures are aligned, the pin 64 is inserted through both apertures to lock the tube 60 against vertical movement relative to the tube 62. An electrical receptical 68 is attached to the tube 60 and includes an electrical cord 70 for connecting the receptacle 68 to a conventional electrical outlet. Electrical wiring (not shown) extends from the outlet 68 through the tube 60 to the light fixture 56. The light fixture 56 includes a switch which is opened or closed by means of a switch arm 72. When not in use, the cord 70 is wrapped in loops around a pair of spaced hooks 74 and 76 which are fixed to the valet 10.

Figure 5:
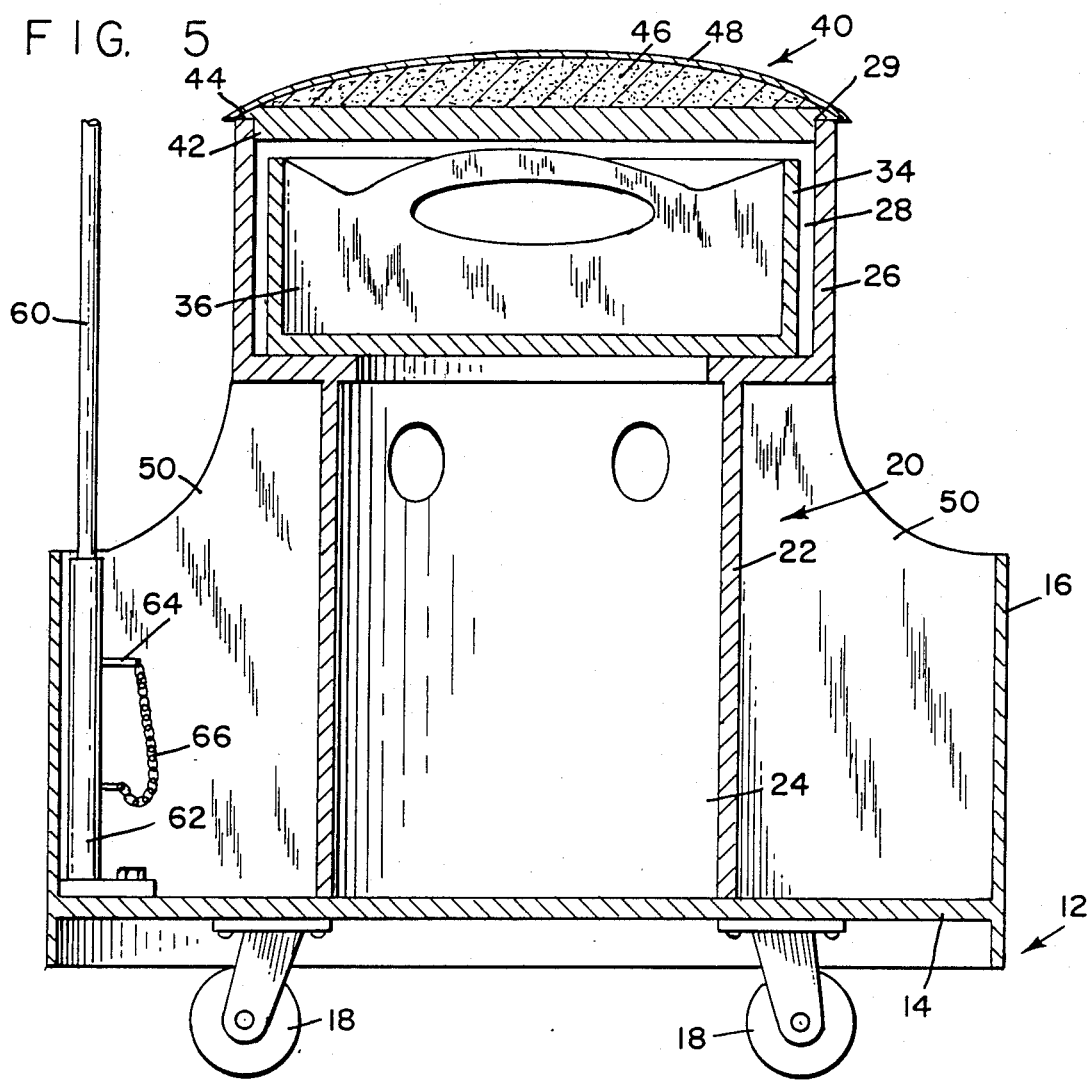
FIG. 5 is a vertical cross sectional view taken along the line V—V of FIG. 3.

The operation and advantages of the present invention will now be readily understood in view of the above description. The valet 10 is transported to the job site in two sections. The tube 58 and all the elements which are attached to it are carried separately from the portion of the valet which consists of the base 12 and the pedestal 20. The base and pedestal combination are carried by the handle 52 when the handle is in the operative position shown by dotted lines in FIG. 1. When the valet 10 is brought to the work site, the tube 60 is inserted within the tube 62 and locked in place by the pin 64. The handle 52 is lowered to the inoperative position shown in solid lines in FIG. 1 and the valet is, thereafter, moved by grasping the handle 57 and rolling the valet along the floor or other supporting surface. The compartment 24 can be utilized for storage of tools or, if desired, a radio or other sound producing appliance. Tools can also be stored in the compartments 51 and certain types of tools can be mounted on the top edge of the annular wall 16 where they are readily accessible. Certain types of tools may also be stored in the tray 34. The tray 34 may also be used for storage of door and window fixtures which are temporarily removed prior to painting of window surfaces. These fixtures may also be stored in one of the compartments 51, if desired. When painting is being done by the craftsman, the cover 40 and the tray 34 are temporarily removed from the upper storage compartment 28. The paint bucket 31 is inserted within the compartment 28 so that it is supported on the shelf 30 and extends above the opening 29 as shown in FIG. 2. The bucket 31 is, thereby positioned at a convenient height for the painter. The valet, with the bucket supported thereon, can be moved quite easily around the room as the room is being painted by grasping the handle 57 and rolling the valet along the floor. Since the light fixture 56 is part of the valet, the painter or craftsman is always assured of proper lighting at the exact location where he or she is working. The electrical receptacle 68 provides a convenient source of electrical power when it becomes necessary to use power tools. When the cover 40 is in place as shown in FIGS. 1 and 5, the valet also functions as a sitting stool. This is particularly useful for coffee and lunch breaks where, typically, no other seating is available. The valet is also used advantageously as a sitting stool for certain work situations where work is being performed at a relatively low level where the work can be performed more efficiently and easily by sitting down.

It is obvious that minor changes may be made in the form and construction of the invention without departing from the material spirit thereof. It is not, however, desired to confine the invention to the exact form herein shown and described, but it is desired to include all such has properly come within the scope claimed.

The invention having been thus described, what is claimed as new and desired to secure by Letters Patent is:

1. A craftsman's valet comprising:
 (a) a supporting base having a bottom surface, a top surface and an annular vertical wall which extends upwardly from said top surface,
 (b) a pedestal which is mounted on said top surface, said pedestal having annular outer surface which is spaced from said vertical wall and defines with said vertical wall an annular storage space, said pedestal having an upper end for supporting a circular bucket,
  wherein the upper end of said pedestal comprises an annular vertical wall having an inner annular vertical surface, and an upper annular edge surface which defines a circular top opening for receiving the bottom end of a circular bucket, and
  supporting means adjacent the upper end of said pedestal for limiting the vertical distance that the bottom end of the bucket can be inserted into said circular opening, said supporting means consisting of a shelf along said inner annular vertical surface below said upper annular edge and defining with said inner annular surface and said upper annular edge surface an upper storage compartment, and
 (c) a removable circular tray which rests on said shelf within said upper storage compartment when there is no bucket in said annular storage space.

2. A craftsman's valet as recited in claim 1, wherein said tray comprises:
 (a) a circular bottom floor
 (b) an annular vertical wall extending upwardly from said circular bottom floor
 (c) a vertical partition within said vertical wall which divides said tray into two compartments, said partition having a carrying handle.

3. A craftsman's valet as recited in claim 1, wherein said shelf is spaced from said supporting base top surface so as to define a lower storage compartment and said shelf has a central opening to said lower storage compartment.

4. A craftman's valet as recited in claim 3, wherein said pedestal has at least one aperture which extends from said lower storage compartment to outside of said pedestal.

5. A craftsman's valet as recited in claim 1, further comprising a cover for said circular top opening which enables the valet to function as a sitting stool.

6. A craftsman's valet as recited in claim 5, wherein said cover comprises:
 (a) a circular leg which fits into said circular top opening,
 (b) a cushioned seat at the top of circular leg, and
 (c) a flange between said leg and said cushioned seat which rests on said upper annular edge surface.

7. A craftsman's valet as recited in claim 1, wherein there is at least one partition between said annular vertical wall and the annular outer surface of said pedestal for dividing said annular storage space into at least two compartments.

8. A craftsman's valet as recited in claim 1, further comprising:
(a) a plurality of wheels which are mounted for rotation on said supporting base for supporting said base,
(b) an elongated upwardly extending supporting fixture, which is mounted to the base, and
(c) a handle which is fixed to the upper end of said supporting fixture.

9. A craftsman's valet as recited in claim 8, wherein said wheels are castor wheels which are mounted to the bottom surface of said supporting base.

10. A craftsman's valet as recited in claim 8, wherein a light fixture is fixed to the upper end of said supporting fixture.

11. A craftsman's valet as recited in claim 10, wherein an electrical receptacle is fixed to said supporting fixture and an electrical cord is operatively connected to said receptacle.

12. A craftsman's valet as recited in claim 11, wherein a pair of vertically spaced hooks are fixed to said supporting fixture for enabling said electrical cord to be wound in loops between said hooks.

13. A craftsman's valet comprising:
(a) a wheeled supporting base,
(b) a pedestal which is mounted on said supporting base, the upper end of said pedestal having an upper storage compartment and a circular top opening to said upper storage compartment for receiving the circular bottom end of a circular bucket, the lower end of said pedestal having a lower storage compartment,
(c) a shelf between said upper and lower storage compartments for supporting the circular bottom end of said circular bucket which is placed into said upper storage compartment said shelf having a central opening to said lower storage compartment,
(d) a cover for said top opening which enables said valet to be used as a sitting stool,
(e) an elongated upwardly extending supporting fixture,
(f) means for removably mounted said supporting fixture of said base,
(g) a primary handle which is fixed to the upper end of said supporting fixture for pushing and pulling the valet along a supporting surface, and
(h) a secondary handle which is movably mounted on said pedestal for movement between an operative position to an inoperative position to enable said valet to be carried by said secondary handle when said handle is in said operative position.

14. A craftsman's valet as recited in claim 13, wherein said supporting fixture is a first vertical tube and a second vertical tube which is fastened said base and which has an upper opening for receiving said first vertical tube.

15. A craftsman's valet as recited in claim 14, further comprising latching means for releasably locking said first vertical tube within said second vertical tube.

* * * * *